US011029517B2

(12) United States Patent
Kobayashi

(10) Patent No.: US 11,029,517 B2
(45) Date of Patent: Jun. 8, 2021

(54) VIRTUAL IMAGE DISPLAY DEVICE

(71) Applicant: JVC KENWOOD Corporation, Yokohama (JP)

(72) Inventor: Manabu Kobayashi, Yokohama (JP)

(73) Assignee: JVC KENWOOD CORPORATION, Yokohama (JP)

( * ) Notice: Subject to any disclaimer, the term of this patent is extended or adjusted under 35 U.S.C. 154(b) by 229 days.

(21) Appl. No.: 16/448,194

(22) Filed: Jun. 21, 2019

(65) Prior Publication Data

US 2019/0310474 A1    Oct. 10, 2019

Related U.S. Application Data

(63) Continuation of application No. PCT/JP2018/010721, filed on Mar. 19, 2018.

(30) Foreign Application Priority Data

Jun. 30, 2017  (JP) .............................. JP2017-128730

(51) Int. Cl.
*G02B 27/01*        (2006.01)
*B60K 35/00*        (2006.01)

(52) U.S. Cl.
CPC .......... *G02B 27/0101* (2013.01); *B60K 35/00* (2013.01); *G02B 27/01* (2013.01); *G02B 27/0149* (2013.01); *B60K 2370/155* (2019.05); *B60K 2370/1529* (2019.05); *B60K 2370/23* (2019.05); *B60K 2370/31* (2019.05); *B60K 2370/334* (2019.05); *G02B 2027/012* (2013.01); *G02B 2027/0159* (2013.01)

(58) Field of Classification Search
CPC .......... G02B 27/0101; G02B 2027/012; G02B 2027/0121; G02B 27/011; G02B 27/0172; G02B 27/01; B60K 2370/1529; B60K 2370/31; B60K 35/00; B60K 2370/334; B60K 2370/155; G03B 21/28
See application file for complete search history.

(56) References Cited

FOREIGN PATENT DOCUMENTS

| GB | 2458898 A    | 10/2009 |
|----|--------------|---------|
| JP | 62225429 S   | 10/1987 |
| JP | 2016159656 A | 9/2016  |

OTHER PUBLICATIONS

Byung-Hyun Kim, et al., "Optical System Design for a Head-up Display Using Aberration Analysis of an Off-axis Two-mirror System", Journal of the Optical Society of Korea vol. 20, No. 4, Aug. 2016, pp. 481-487.

*Primary Examiner* — Ryan D Howard
(74) *Attorney, Agent, or Firm* — Brundidge & Stanger, P.C.

(57) ABSTRACT

A virtual image display device includes: a display unit that generates an image display light by modulating an illumination light; and a projection optical system that includes a concave mirror for reflecting the image display light toward a virtual image presentation plate and a convex lens provided between the display unit and the concave mirror. The display unit is provided at a position closer to the convex lens than a focal point, within a meridional plane, of a composite optical system formed by the virtual image presentation plate and the projection optical system.

4 Claims, 5 Drawing Sheets

51s

52f

53m

VIRTUAL IMAGE DISPLAY DEVICE

CROSS REFERENCE TO RELATED APPLICATION

Priority is claimed to Japanese Patent Application No. 2017-128730, filed on Jun. 30, 2017, the entire content of which is incorporated herein by reference.

BACKGROUND OF THE INVENTION

1. Field of the Invention

The present invention relates to a virtual image display device.

2. Description of the Related Art

Recently, head-up displays are available for use as display devices for vehicles. A head-up display projects an image display light toward, for example, a windshield of a vehicle and displays a virtual image based on the image display light, superimposing the virtual image on the scenery outside the vehicle. A windshield has two interfaces inside and outside the vehicle. The image display lights reflected at the respective interfaces and visually perceived may be superimposed with a shift and viewed as double images. To inhibit double images from being produced, there is proposed a mathematical expression for defining a viewing distance to contain the amount of shift between double images within the resolution of the human eyes and obtaining an optical arrangement that realizes the viewing distance.

The technology described above requires a viewing distance of about 20 m to the position of presentation of a virtual image ahead of the user in order to reduce double images. It is preferred to reduce the occurrence of double images suitably even when the virtual image is presented to be visible at a closer position.

SUMMARY OF THE INVENTION

The embodiments address the above-described issue, and a general purpose thereof is to provide a technology for improving the visibility of a virtual image presented.

A virtual image display device according to an embodiment of the present invention includes: a display unit that generates an image display light by modulating an illumination light; and a projection optical system that includes a concave mirror for reflecting the image display light toward a virtual image presentation plate and a convex lens provided between the display unit and the concave mirror. The display unit is provided at a position closer to the convex lens than a focal point, within a meridional plane, of a composite optical system formed by the virtual image presentation plate and the projection optical system.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENT

The invention will now be described by reference to the preferred embodiments. This does not intend to limit the scope of the present invention, but to exemplify the invention.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially identical functions and structures are represented by the same reference symbols, and the description is not duplicated. Elements not directly relevant to the invention are omitted from the illustration.

Figure 1:
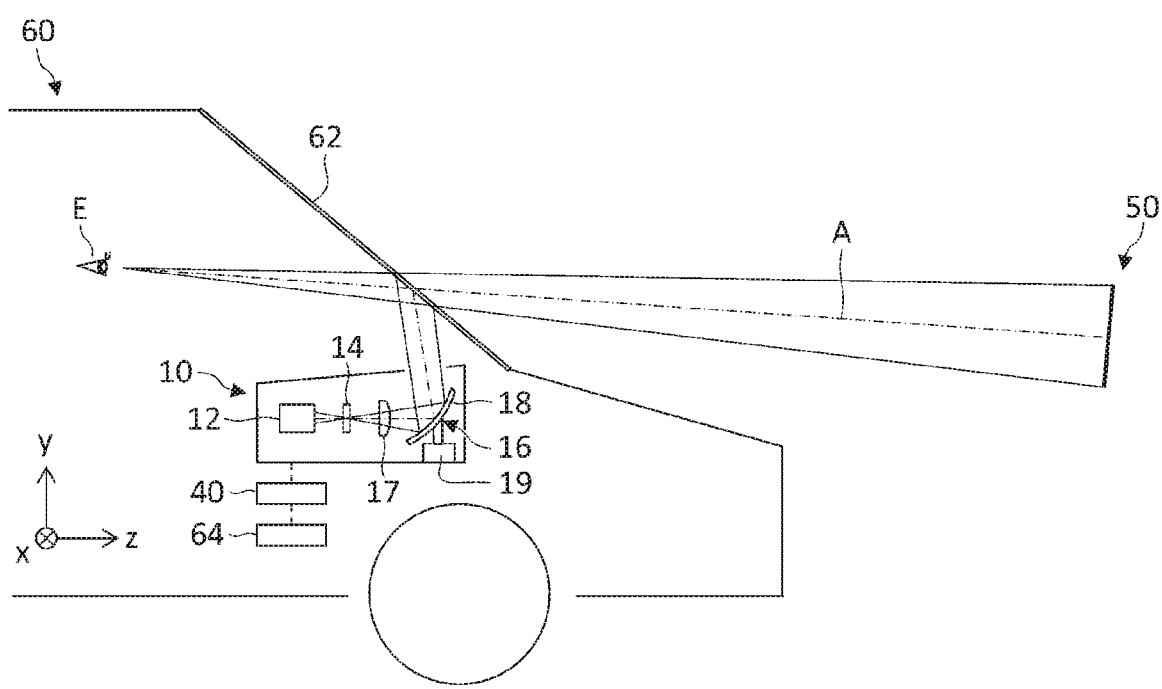
FIG. 1 schematically shows a configuration of a virtual image display device according to the embodiment.

FIG. 1 schematically shows how a virtual image display device 10 according to the embodiment is installed. In this embodiment, the virtual image display device 10 is installed in a dashboard of a vehicle 60, which exemplifies a moving object. The virtual image display device 10 is a so-called head-up display device. The virtual image display device 10 presents a virtual image 50 in front of the vehicle 60 in the direction of travel (rightward direction in FIG. 1) by projecting an image display light toward a windshield 62, which is a virtual image presentation plate. The user E (e.g., the driver) can see the virtual image 50 superimposed on the actual scenery via the windshield 62. Therefore, the driver E can access information shown in the virtual image 50 substantially without moving the line of sight while driving the vehicle. Referring to the FIG. 1, the direction of travel of the vehicle 60 (longitudinal direction) is defined as the z direction, the vertical direction of the vehicle 60 (up/down direction) is defined as the y direction, and the transversal direction of the vehicle 60 is defined as the x direction.

The virtual image display device 10 includes an illumination unit 12, a display unit 14, a projection optical system 16, and a control unit 40. The illumination unit 12 is a light source for generating an image display light and generates an illumination light for illuminating the display unit 14. The illumination unit 12 includes a light emitting device such as a light emitting diode (LED) and a laser diode (LD), and an optical device for adjusting the light intensity distribution and angle distribution of the light output from the light emitting device. The illumination unit 12 illuminates the display unit 14 with a substantially uniform white light. The configuration of the illumination unit 12 is not limited to any particular type. For example, a light emitting device such as a light tunnel, a Fresnel lens, and a light diffusion plate may be used to condition the output light from the light emitting device.

The display unit 14 modulates an illumination light from the illumination unit 12 to generate an image display light and forms an intermediate image corresponding to the display content of the virtual image 50. The display unit 14 includes an image display device of transmission type for generating an image display light. For example, the display unit 14 includes a display device such as a liquid crystal panel of transmission type. The image display device receives an image signal transmitted from the control unit 40 and generates an image display light for the display content corresponding to the image signal. The display unit 14 may further include an optical device for conditioning the orientation and light distribution angle of the image display light. For example, the display unit 14 may include a screen of transmission type such as a microlens array sheet and a light scattering sheet.

The projection optical system 16 projects the image display light generated by the display unit 14 toward the windshield 62. The projection optical system 16 includes a convex lens 17 and a concave mirror 18. The concave mirror 18 reflects the image display light from the display unit 14 toward the windshield 62 to enlarge the intermediate image displayed on the display unit 14 for presentation to the user E. The convex lens 17 is provided between the display unit 14 and the concave mirror 18 and changes the direction of the image display light directed from the display unit 14 toward the concave mirror 18.

The projection optical system 16 may further include an additional optical device (not shown). For example, a planar mirror for folding the light path from the illumination unit 12 to the concave mirror 18 may be provided. The additional planar mirror may be provided between the illumination unit 12 and the display unit 14 or provided between the display unit 14 and the convex lens 17 or provided between the convex lens 17 and the concave mirror 18. Two or more planar mirrors may be provided in the projection optical system 16. Further, the convex lens 17 may be formed by a lens group comprised of a plurality of lenses.

The driving unit 19 is configured to change the angle of the concave mirror 18. The driving unit 19 adjusts the orientation of the concave mirror 18 to change the direction of line of sight A directed to the virtual image 50. This allows the virtual image 50 to be presented properly to users E whose eyes are at different heights.

The control unit 40 operates the illumination unit 12, the display unit 14, and the driving unit 19 to generate an image for display and present the virtual image 50 corresponding to the image for display. The control unit 40 is connected to an external device 64 and generates the image for display based on the information from the external device 64.

The external device 64 is a device for generating original data for an image displayed as the virtual image 50. For example, the external device 64 may be an Electronic Control Unit (ECU) for the vehicle 60, a navigation device, or a mobile device such as a cell phone, smartphone, and tablet. The external device 64 transmits, to the control unit 40, image data necessary to display the virtual image 50, information indicating the content and type of the image data, and information related to the vehicle 60 such as the speed and current position of the vehicle 60.

In this embodiment, the image display lights reflected at the two interfaces inside and outside the vehicle and visually perceived are prevented from being displayed with a shift and viewed as double images, by providing the display unit 14 at a predetermined position. Before describing the arrangement of the display unit 14 according to the embodiment in detail, a description will be given of the occurrence of double images with reference to a comparative example.

Figure 2:
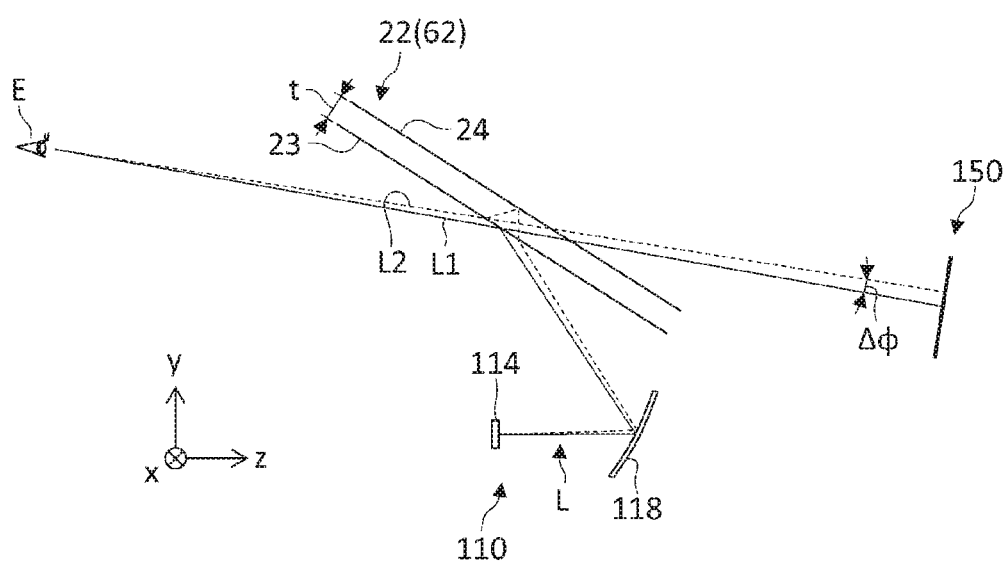
FIG. 2 shows an optical arrangement in a virtual image display device according to the comparative example.

FIG. 2 shows an optical arrangement in a virtual image display device 110 according to the comparative example and schematically shows that double images are produced. The virtual image display device 110 is provided with a display unit 114 and a concave mirror 118 configured in a manner similar to that of the embodiment described above. The concave mirror 118 reflects the image display light L from the display unit 114 toward a virtual image presentation plate 22 embodied by the windshield 62. The virtual image presentation plate 22 has a predetermined thickness t and has a first principal surface 23 and a second principal surface 24. The first principal surface 23 corresponds to the interface of the windshield 62 inside the vehicle, and the second principal surface 24 corresponds to the interface of the windshield 62 outside the vehicle.

The image display light projected onto the windshield 62 travels toward the user E primarily via two light paths L1, L2. The first light path L1 is a light path in which the light is reflected by the first principal surface 23 and travels toward the user E. The second light path L2 is a light path in which the light is refracted by the first principal surface 23, reflected by the second principal surface 24, and then re-refracted by the first principal surface 23 and travels toward the user E. If there is an angular difference $\Delta\varphi$ between the first light path L1 and the second light path L2 leading toward the user E, the image display lights traveling on the two light paths L1, L2 are visually perceived as being shifted from each other according to the angular difference $\Delta\varphi$, producing double images in a virtual image 150. While it is possible to postulate a light path in which the light is reflected multiple times between the first principal surface 23 and the second principal surface 24 and travels toward the user E, the component of the image display light reflected multiple times and traveling toward the user E is small and can be neglected in a normal mode of usage.

Figure 3:
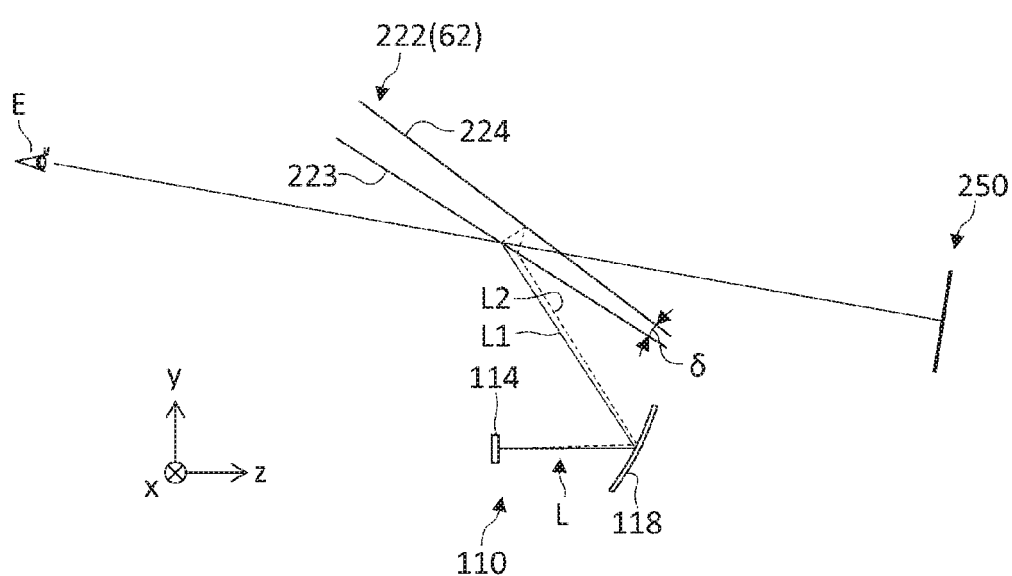
FIG. 3 shows an optical arrangement in the virtual image display device according to the comparative example.

FIG. 3 shows an optical arrangement in the virtual image display device 110 according to the comparative example and schematically shows how double images are inhibited by using a virtual image presentation plate 22 different from that of FIG. 2. The virtual image presentation plate 222 shown in FIG. 3 is a so-called "wedge glass" and is configured such that the thickness of the virtual image presentation plate 222 varies. This results in a first principal surface 223 and a second principal surface 224 of the virtual image presentation plate 222 having mutually different angles of inclination relative to the virtual image display device 110, and an angular difference $\delta$ is provided between the surfaces. By using a wedge glass in which the angular difference $\delta$ is provided between the two principal surfaces 223, 224, the angular difference $\Delta\varphi$ between the first light path L1 and the second light path L2 is corrected, and a virtual image 250 in which double images are reduced is presented.

However, a "wedge glass" like this need be formed by controlling the angular difference $\delta$ with high precision and so is more expensive than an ordinary glass having a uniform thickness t. Further, forming the windshield 62 of the vehicle 60 by using a wedge glass not only requires a dedicated wedge glass adapted to the shape of the vehicle 60 but also requires replacing the entirety of the windshield 62 so that a heavy cost will be incurred. It is therefore preferred to reduce the occurrence of double images without using a special wedge glass.

Figure 4:
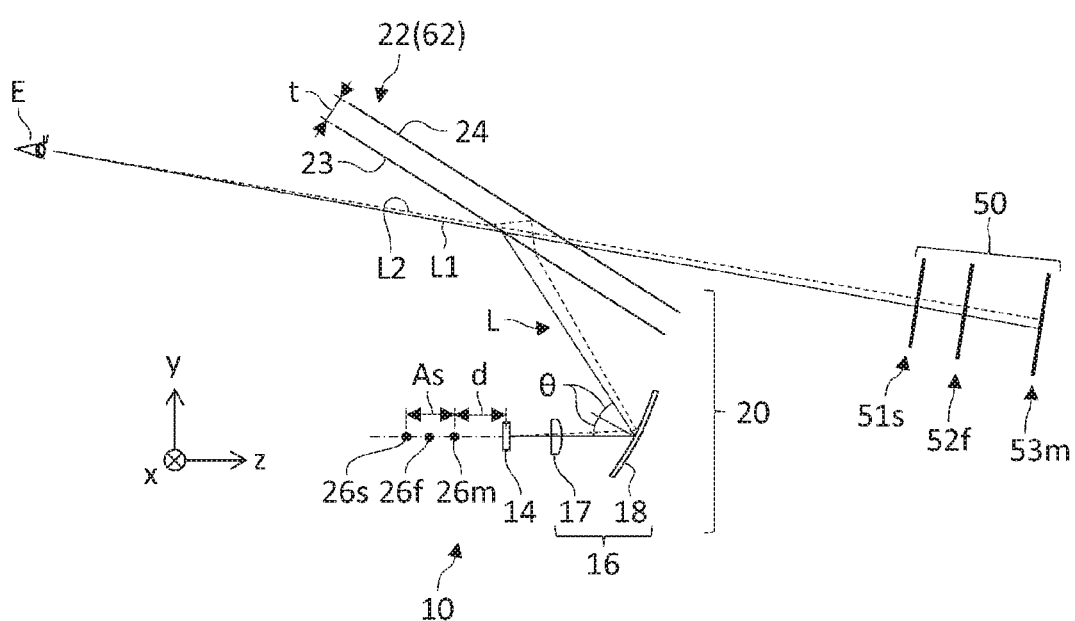
FIG. 4 shows an optical arrangement in the virtual image display device according to the embodiment in detail.

FIG. 4 shows an optical arrangement in the virtual image display device 10 according to the embodiment in detail and corresponds to the configuration of FIG. 1. In FIG. 4, an ordinary glass having a uniform thickness t is used as the virtual image presentation plate 22 instead of a wedge glass. According to the embodiment, the occurrence of double images is inhibited by inserting a convex lens 17 between the display unit 14 and the concave mirror 18 and providing the display unit 14 at a proper position. In particular, the occurrence of double images is inhibited by providing the display unit 14 at a position closer to the convex lens 17 than a focal point 26m within the meridional plane of a composite optical system 20 formed by the projection optical system 16 and the virtual image presentation plate 22. The term "meridional plane" refers to a plane that includes the light axis of the composite optical system 20 and the principal ray of the image display light L. In the example shown in FIG. 4, the yz plane represents the meridional plane.

In the composite optical system 20, the image display light L is diagonally incident on the concave mirror 18 at an angle θ so that an astigmatic difference As is produced. As a result, the focal point 26m within the meridional plane of the composite optical system 20 is at a position different from that of a focal point 26s within the sagittal plane. The focal point 26m within the meridional plane is located nearer the convex lens 17 than the focal point 26s within the sagittal plane. The term "sagittal plane" refers to a plane that includes the light axis of the composite optical system 20 and is a plane perpendicular to the meridional plane. A composite focal point 26f of the composite optical system 20 is located between the focal point 26m within the meridional plane and the focal point 26s within the sagittal plane.

The focal point of the composite optical system 20 is determined by the characteristics and arrangement of the convex lens 17, the concave mirror 18, and the virtual image presentation plate 22 forming the composite optical system 20. More specifically, the focal point of the composite optical system 20 is determined by the focal distance of the convex lens 17, the focal distance of the concave mirror 18, the focal distance of the virtual image presentation plate 22, and the relative distances and orientations of the convex lens 17, the concave mirror 18, and the virtual image presentation plate 22. The virtual image presentation plate 22 may have a predetermined curvature. The first principal surface 23 may be concave in shape, and the second principal surface may be convex in shape. Alternatively, the first principal surface 23 and the second principal surface 24 may be flat in shape. The positions of the focal points 26f, 26m, and 26s of the composite optical system 20 are shown only schematically in FIG. 4 and do not indicate the accurate positions of the focal points based on the optical arrangement of the composite optical system 20.

In this embodiment, the display unit 14 is provided more toward the convex lens 17 than the focal points 26f, 26m, and 26s of the composite optical system 20. Therefore, it appears to the user E that the virtual image 50 is presented at a finite distance. Because of the astigmatic difference As, a first virtual image 51s that appears to be in focus in the transversal direction (within the sagittal plane) and a third virtual image 53m that appears to be in focus in the vertical direction (within the meridional plane) are presented at positions different in the direction of depth in the eyes of the user E. More specifically, the focal distance within the meridional plane is shorter than the focal distance within the sagittal plane, and the display unit 14 is provided nearer the focal point 26m within the meridional plane than the focal point 26s within the sagittal plane. Therefore, the first virtual image 51s that is in focus within the sagittal plane appears to be located toward the user, and the third virtual image 53m that is in focus in the meridional plane appears to be located away from the user. Further, a second virtual image 52f that appears to be in focus both in the vertical direction and the transversal direction is located between the first virtual image 51s and the third virtual image 53m.

Figure 5A:
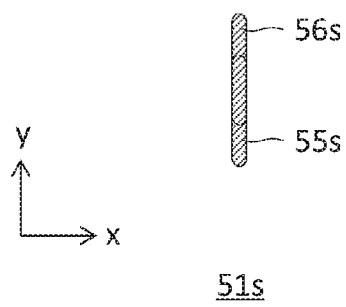
FIGS. 5A, 5B, and 5C schematically show how the first virtual image, the second virtual image, and the third virtual image appear.
Figure 5B:
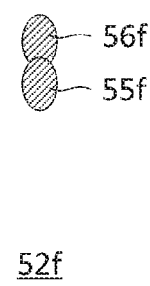
Figure 5C:
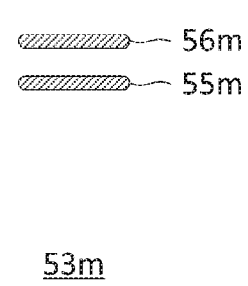

FIGS. 5A-5C schematically show how the first virtual image 51s, the second virtual image 52f, and the third virtual image 53m appear and schematically shows spot shapes of the image display light at the positions where the virtual images are presented. Referring to FIGS. 5A-5C, first spots 55s, 55f, and 55m correspond to the image display light of the first light path L1, and second spots 56s, 56f, and 56m correspond to the image display light of the second light path L2.

FIG. 5A schematically shows the spot shape of the first virtual image 51s. The first virtual image 51s is in focus in the transversal direction (x direction) but is out of focus in the vertical direction (y direction) and so has a vertically elongated spot shape. For this reason, even when the light paths L1, L2 of the image display light reflected by the first principal surface 23 and the second principal surface 24, respectively, are shifted in the vertical direction, the spots appear to be continuous in the vertical direction as shown in FIG. 5A.

FIG. 5B schematically shows the spot shape of the second virtual image 52f. The second virtual image 52f is in focus both in the vertical direction and the transversal direction and has a circular or elliptical spot shape having a small difference between the spot radius in the vertical direction and that of the transversal direction. In the illustrated example, the first spot 55f and the second spot 56f appear to be continuous vertically.

FIG. 5C schematically shows the spot shape of the third virtual image 53m. The third virtual image 53m is in focus in the vertical direction but is out of focus in the transversal direction and so has a transversally elongated spot shape. As a result, the light paths L1, L2 are shifted in the vertical direction, and the spots appear to be separated in the vertical direction as shown in FIG. 5C. As a result, the third virtual image 53m is presented in such a manner double images are more easily seen than in the case of the first virtual image 51s and the second virtual image 52f.

In this embodiment, the first virtual image 51s is presented toward the user and the third virtual image 53m is presented away from the user as shown in FIG. 4. Therefore, the user E is considered to primarily focus on the first virtual image 51s toward the user or the intermediate second virtual image 52f. Thus, double images of the virtual image 50 are suitably reduced by increasing the visibility of the first virtual image 51s and the second virtual image 52f in which double images are relatively less visible and, at the same time, reducing the visibility of the third virtual image 53f in which double images are relatively more visible.

In order to suitably realize the advantage described above, it is necessary to set the astigmatic difference As of the composite optical system 20 properly. If the astigmatic difference As is too small, the distance between the first virtual image 51s and the third virtual image 53m will be short, which will prompt the user E to focus also on the third virtual image 53m. Hence, the advantage of reducing double images will be impaired. If the astigmatic difference As is too large, on the other hand, the imaging quality of the virtual image 50 will be lowered, and the virtual image 50 will appear blurred.

The magnitude of the astigmatic difference As of the composite optical system 20 primarily depends on the focal distance f1 of the concave mirror 18 and the incidence and reflection angle θ of the image display light L in the concave mirror 18, provided that the composite focal distance f of the composite optical system 20 remains constant. More specifically, the larger the focal distance f1 of the concave mirror 18 (i.e., the larger the light concentration power 1/f1 of the concave mirror 18) and the larger the incidence and reflection angle θ, the larger the astigmatic difference As. Due to the constraint imposed on the optical arrangement in the virtual image display device 10, it is difficult to approximate the incidence and reflection angle θ to 0°. The value of the incidence and reflection angle θ will be in a range of about 10°-45° and, typically, about 20°-35°. It is therefore primarily necessary to adjust the focal distance f1 of the concave mirror 18 in order to set the value of the astigmatic difference As properly.

Our study shows that it is necessary to configure the focal distance f1 of the concave mirror 18 to be about 100 mm-500 mm if it is attempted to set a proper astigmatic difference As by using only the concave mirror 18 as the projection optical system 16. If the focal distance f1 of the concave mirror 18 is small, however, the curvature of the concave mirror 18 will be large, which leads to an increase in distortion of the virtual image 50. We have arrived at an idea of reducing the astigmatic difference As of the composite optical system As while also maintaining a large focal distance of the concave mirror 18, by providing a convex lens 17 between the display unit 14 and the concave mirror 18. More specifically, by configuring the focal distance f1 of the concave mirror 18 to be larger than the focal distance f2 of the convex lens 17, the astigmatic difference As is reduced while also securing the ratio of magnification of the virtual image 50 in the composite optical system 20 as a whole. If the focal distance f1 is enlarged and the light concentration power 1/f1 of the concave mirror 18 is reduced too much accordingly, on the other hand, the astigmatic difference As will not be substantively produced. It is therefore necessary to provide the concave mirror 18 with a certain curvature. Our study shows that it is preferred to configure the focal distance f1 of the concave mirror 18 to be not less than 1.1 times and not more than 5 times, and, more preferably, not less than 1.5 times and not more than 3 times the focal distance f2 of the convex lens 17. To give specific numerical examples, the focal distance f1 of the concave mirror 18 is about 500 mm-2000 mm, and the focal distance f2 of the convex lens 17 is about 200 mm-600 mm. The composite focal distance f of the composite optical system 20 in this case will be about 150 mm-500 mm, and the astigmatic difference As of the composite optical system 20 will be about 4 mm-40 mm.

By providing the display unit 14 at a proper position in the composite optical system 20 configured as described above, the virtual image 50 is presented at a proper viewing distance and a magnification ratio. More specifically, it is preferred to configure the distance d between the focal point 26m within the meridional plane of the composite optical system 20 and the display unit 14 to be about 5%-20% of the focal distance $f_M$ of the composite optical system 20 within the meridional plane. For example, denoting the magnification ratio of the virtual image 50 by 3, the distance d between the focal point 26m within the meridional plane of the composite optical system 20 and the display unit 14 is given by $d=f_M H/\beta$.

A description will now be given of how the virtual image 50 will appear when the orientation of the concave mirror 18 changes. When the incidence and reflection angle θ changes in association with a change in the orientation of the concave mirror 18, the value of the astigmatic difference As also changes in accordance with the amount of change. More specifically, with an increase in the incidence and reflection angle θ, the astigmatic difference As increases, and the distance between the first virtual image 51s and the third virtual image 53s also increases. As a result, when the incidence and reflection angle θ changes to become larger, the appearance of the virtual image 50 changes in such a manner that double images become less visible. With a decrease in the incidence and reflection angle θ, on the other hand, the astigmatic difference As decreases so that the appearance of the virtual image 50 changes in such a manner that double images become more visible. Meanwhile, reduction in the astigmatic difference As increases the imaging quality of the virtual image 50, which results in the virtual image 50 that is less blurred. Accordingly, by using the composite optical system 20 as described above to change the angle θ of the concave mirror 18 in a predetermined range from a position where the scale of double images that occur and the imaging quality of the virtual image 50 are balanced, the direction of line of sight A directed to the virtual image 50 can be adjusted without impairing the balance seriously.

With the configuration described above, the embodiment enables the composite focal distance f and the astigmatic difference As to be set to proper values by using the projection optical system 16 in which the convex lens 17 and the concave mirror 18 are combined. This makes it possible to present the first virtual image 51s and the third virtual image 53m at different positions in the direction of depth and present the virtual image 50 in such a manner that double images are relatively less visible, while also preventing the imaging quality of the virtual image 50 from being lowered excessively. Therefore, according to the embodiment, occurrence of double images of the virtual image 50 is suitably reduced without using an expensive member such as a wedge glass.

According to the embodiment, it is ensured that the viewing distance of the virtual image 50 as seen from the user E is a finite value because the display unit 14 is displaced from the composite focal point 26f of the composite optical system 20. As a result, the visibility of the virtual image 50 superimposed on a scene viewed at a finite distance is improved. According to the embodiment, the virtual image 50 can be presented at a relatively near position such as 2 m-10 m instead of a remote position such as 20 m, for example.

The present invention has been described above with reference to the embodiment but is not limited to the embodiment. Appropriate combinations or replacements of the features of the illustrated examples are also encompassed by the present invention.

It should be understood that the invention is not limited to the above-described embodiment but may be modified into various forms on the basis of the spirit of the invention. Additionally, the modifications are included in the scope of the invention.

What is claimed is:
1. A virtual image display device comprising:
a display unit that generates an image display light by modulating an illumination light; and
a projection optical system that includes a concave mirror for reflecting the image display light toward a virtual image presentation plate and a convex lens provided between the display unit and the concave mirror, wherein
the display unit is provided at a position closer to the convex lens than a focal point, within a meridional plane, of a composite optical system formed by the virtual image presentation plate and the projection optical system, and a focal distance of the concave mirror is longer than a focal distance of the convex lens.

2. The virtual image display device according to claim 1, wherein the focal distance of the concave mirror is not less than 1.5 times and not more than 3 times the focal distance of the convex lens.

3. The virtual image display device according to claim 1, wherein denoting a ratio of magnification of a virtual image by the composite optical system by $\beta$, and a focal distance of the composite optical system within the meridional plane by $f_M$, the display unit is provided at a distance $d=f_M/\beta$ from the focal point of the composite optical system within the meridional plane.

4. The virtual image display device according to claim 1, wherein the virtual image presentation plate is a windshield provided in a vehicle and having a uniform thickness.

* * * * *